United States Patent
Collier et al.

(10) Patent No.: US 7,412,165 B1
(45) Date of Patent: *Aug. 12, 2008

(54) DCC LOOP PLUG

(75) Inventors: Jack Berry Collier, Douglasville, GA (US); James Gregory Morris, Sr., Austell, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/733,152

(22) Filed: Apr. 9, 2007

Related U.S. Application Data

(63) Continuation of application No. 10/109,892, filed on Mar. 28, 2002, now Pat. No. 7,203,420.

(51) Int. Cl.
*H04B 10/08* (2006.01)
(52) U.S. Cl. .............................. 398/16; 398/32; 398/33
(58) Field of Classification Search ............... 398/9–17, 398/20–21, 25, 32, 33; 370/224, 247–249, 370/251–253
See application file for complete search history.

(56) References Cited

U.S. PATENT DOCUMENTS

| | | | |
|---|---|---|---|
| 4,779,186 A | 10/1988 | Handke et al. | |
| 4,890,254 A | 12/1989 | Cooley | |
| 5,436,554 A | 7/1995 | Decker, Jr. | |
| 6,816,987 B1 | 11/2004 | Olson et al. | |
| 6,909,894 B1 | 6/2005 | Kingsley et al. | |
| 7,203,420 B1 * | 4/2007 | Collier et al. ................. | 398/16 |

* cited by examiner

*Primary Examiner*—Dzung D Tran

(57) ABSTRACT

Systems and methods are disclosed for testing the functionality of a synchronous optical network having a data communication channel therein. The system includes a testing device connected to a network node within the synchronous optical network and a data communication channel loop back plug connected to the testing device for returning to the synchronous optical network, any signals within the data communication channel received at the testing device. A method is also disclosed for testing a synchronous optical network having a data communication channel therein.

20 Claims, 4 Drawing Sheets

| 15 PIN CONNECTOR | 37 PIN CONNECTOR |
|---|---|
| PIN 2 to 14 | PIN 4 to 6 |
| PIN 4 to 12 | PIN 8 to 17 |
| PIN 5 to 6 | PIN 22 to 24 |
| PIN 8 to 10 | PIN 26 to 35 |

| 15 PIN CONNECTOR | 37 PIN CONNECTOR |
| --- | --- |
| PIN 2 to 14 | PIN 4 to 6 |
| PIN 4 to 12 | PIN 8 to 17 |
| PIN 5 to 6 | PIN 22 to 24 |
| PIN 8 to 10 | PIN 26 to 35 |

FIG. 3

DCC LOOP PLUG

RELATED APPLICATIONS

This patent application is a continuation of co-pending U.S. patent application Ser. No. 10/109,892, filed Mar. 28, 2002, which is incorporated herein by reference.

BACKGROUND

A Synchronous Optical Network, also known as a SONET, is a networking standard for connecting fiber-optic transmission systems. SONET is the American National Standards Institute standard for synchronous data transmission on optical media. The "synchronous" designation means that portions of the data stream may be cross-connected to other portions without demultiplexing. As such, all component portions of the SONET signal may be tied to a single reference clock.

A SONET is considered to be the foundation for the physical layer of the broadband ISDN (BISON). The international equivalent of SONET is synchronous digital hierarchy (SOH). Together, they ensure standards so that digital networks can interconnect internationally, and so that existing conventional transmission systems can take advantage of optical media through tributary attachments.

SONET defines interface standards at the physical layer of the OSI seven-layer model. The standard defines a hierarchy of interface rates that allow data streams at different rates to be multiplexed. SONET establishes Optical Carrier (OC) levels from 51.8 Mbps (about the same as a T-3 line) to 2.48 Gbps.

SONET technology uses architectures called SONET rings. SONET rings are known as self-healing zings. In this manner, SONET rings use two or more transmission paths between network nodes, which are typically optical or digital cross-connects (DCSs) or add/drop multiplexers (ADMs). Consequently, if there is a break in one line, the other may still be available. Typically, the most fault-tolerant architecture is the four-fiber bi-directional ring.

Within the SONET, channels are designated for alarms, maintenance, control, monitoring, administration and communication needs between two section terminating equipments. One such channel is the data communication channel (DCC). The DCC is the upper level bandwidth of the network that allows for communication between parts of the network and is utilized for management, enabling IP addressing and Simple Network Management Protocol (SNMP) access. Typically, the DCC is 3 bytes and is treated as one 192 kbs data channel for the transmission of alarms, maintenance, control, administration as well as other network element communication needs that occur between the SONET nodes. The DCC is also used for testing the functionality of the SONET. In this manner, active test signals are transmitted through the SONET ring, while the ring is simultaneously monitored for any malfunctions.

Currently, a variety of SONET testing devices exists. For example, one testing device may be used to transmit an active test signal through the SONET (in what is commonly called insert/drop mode) while simultaneously monitoring (commonly called monitor mode) the ring for faults. Equipment having these two features are, however, quite expensive. Alternatively, two testing devices can be used to simultaneously perform the same insert/drop and monitoring functions. In this manner, one testing device can be used to perform the insert/drop and the other to act in the monitor mode. Despite being less expensive, this configuration, however, requires more manpower to set up and perform the test.

Consequently, there is a need for a low cost SONET testing device that can be used to simultaneously test a SONET using the insert/drop mode and the monitor mode.

SUMMARY

This disclosure describes systems and methods for allowing a relatively low cost SONET testing device to simultaneously function in both the insert/drop mode and the monitor mode. In this manner, the invention contemplates the use of a DCC loop back plug that enables a testing device, that typically can only operate in either the insert mode or the monitor mode, to operate in both modes when the DCC loop back plug is connected thereto. Such dual mode operation is a result of the DCC loop back plug returning back to the SONET any received signals within the DCC from the testing device without loss of communications between any nodes in the SONET.

In one embodiment of the invention, the system in accordance with the invention comprises a testing device and a DCC loop back plug. The testing device is connected to a network node within the SONET and the DCC loop back plug is connected to the testing device and returns to the SONET any signals within the data communication channel received at the testing device.

BRIEF DESCRIPTION OF THE DRAWINGS

Other features of the invention are apparent from the following detailed description of the embodiments taken in conjunction with the accompanying drawings, of which:

FIG. 3 is a table of pin assignments for a DCC loop plug in accordance with the disclosure.

DETAILED DESCRIPTION

The disclosure enables a SONET testing device to return to the SONET any received signals within the DCC. As such, by connecting a DCC Loop plug to a SONET testing device in accordance with the disclosure, a single testing device (that normally cannot operate in both the insert/drop mode and the monitor) operates in both the insert/drop mode and the monitor mode. As such, the DCC Loop plug greatly reduces the costs associated with performing such tests on a SONET.

Figure 1:
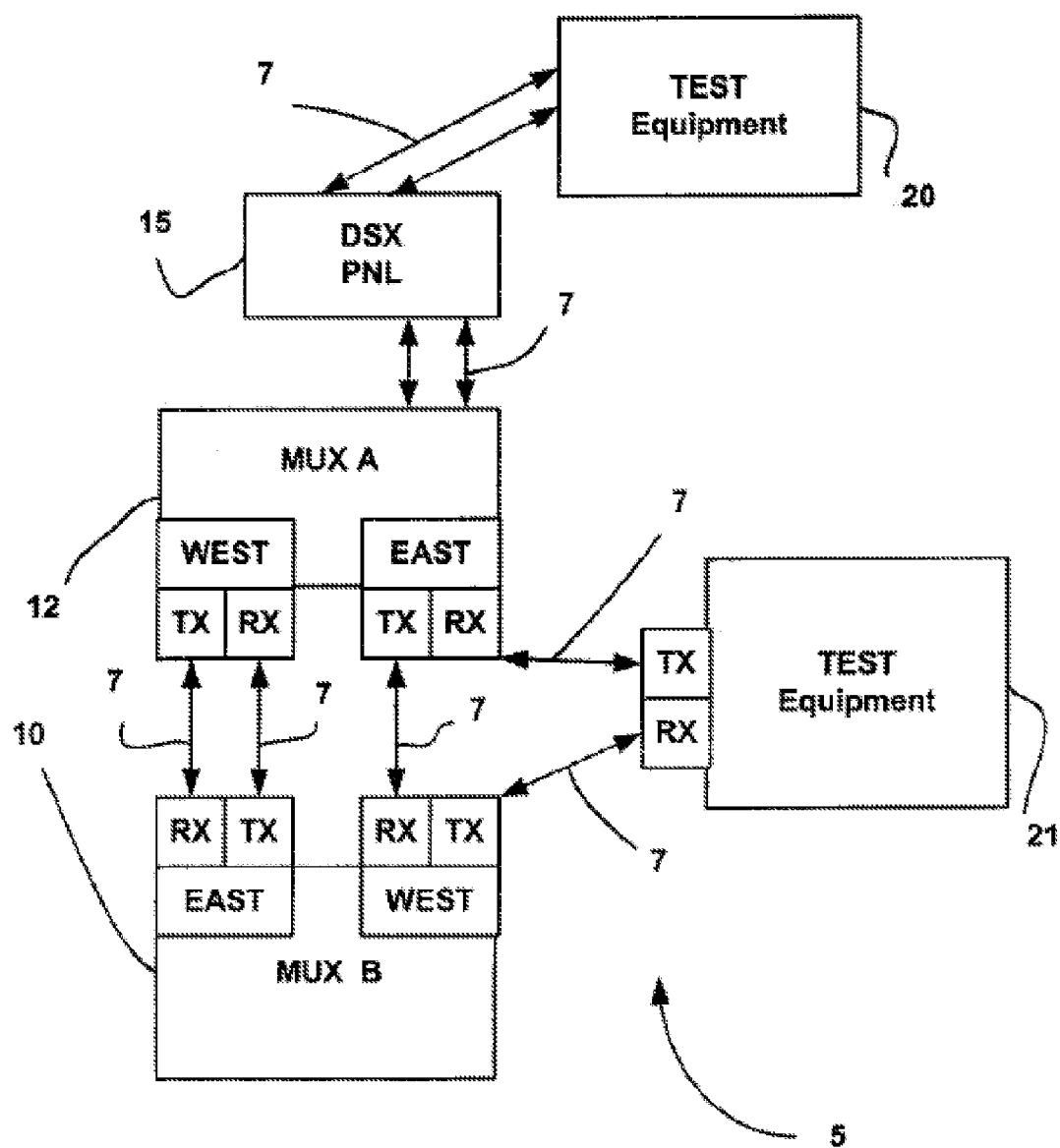
FIG. 1 is a block diagram of an optical network with two testing devises connected thereto as known in the field.

FIG. 1 is a block diagram of a SONET with two testing devices connected thereto as known in the field. As shown, the exemplary SONET ring 5 includes two multiplexers 10, 12 and a digital system cross-connect panel 15 or frames with transmission lines 7 connected therebetween. As shown, multiplexers 10, 12 use receiving RX and transmitting TX ports (each assigned to an EAST or WEST portion of the multiplexer) to transmit and receive signals. The multiplexers 10, 12 may be Add/Drop multiplexers installed at an intermediate point within the SONET ring 5 on a transmission line 7 that enables all signals to come in and all signals to go out. The digital system cross-connect (DSX) panel 15 or frame is a bay or panel to which high-speed lines such as T-1 lines are attached and permits cross connections.

The SONET may also include optical cross connects (not shown). Optical cross connects are network devices used by telecommunication carriers to switch high-speed optical signals (OC-3, OC-12, OC-48, etc.).

FIG. 1 also shows two separate testing devices 20, 21. In this manner, the two separate machines 20, 21 work in conjunction to perform various test functions on the network. For example, one testing device 20 may operate in the INSERT/DROP mode (i.e., inserting an active signal into the data communications channel of the SONET) to check the complete SONET payload (OC3, OC 12, OC 48, etc.) on the DCC for level pointers. The other testing device 21 may operate in a monitor mode (e.g., the testing device may monitor the pointer adjustments, plus or minus, system level errors, loss of signal or DCC failure). Also, provisioning and maintenance signals and any other data information between the nodes may be monitored. Such a test ensures that the SONET is properly connected and all signals therein are being properly transmitted through the DCC in the SONET.

Figure 2:
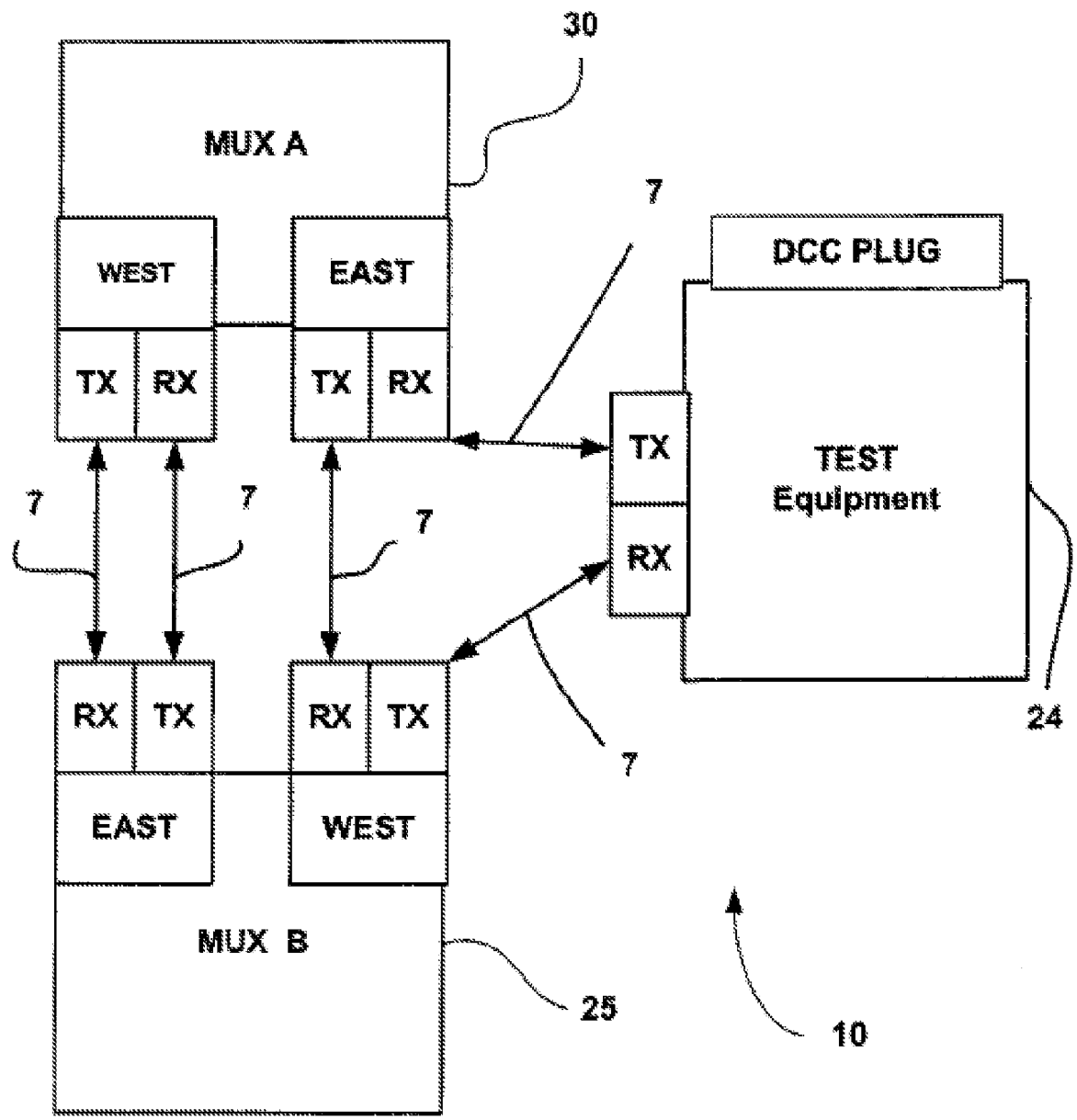
FIG. 2 is a block diagram of an optical network with a single testing device having a DCC loop plug connected thereto in accordance with the disclosure.

FIG. 2 is a block diagram of a SONET ring 10 with a testing device having a DCC loop plug 25 connected thereto in accordance with the disclosure. As shown, the SONET ring 5 includes two multiplexers 25, 30 with transmission lines 7 connected therebetween. The multiplexers may operate at any optical carrier speed, such as, for example, OC-3, OC-12, OC-48, without departing from the scope of the disclosure. Such a ring configuration facilitates the self-healing attribute by enabling the SONET to reroute traffic if one line becomes inoperable. Also shown in FIG. 2 is one testing device 24 with a DCC loop plug 25 in accordance with the disclosure connected thereto. Testing device 24 communicates with the SONET using transmission lines 7.

In one embodiment, the DCC loop back plug 25 may be a 15 pin connector. FIG. 3 shows the pin assignment of the 15 pin connector in accordance with the present disclosure that enable the connector to return to the SONET any DCC signals received from the SONET. In this manner, the 15 pin connector is a standard 15 pin connector of which one ordinarily skilled in the art can appreciate. In this manner, the connector contains a housing and 15 conductive pins disposed within housing for transmitting signals.

As illustrated in FIG. 3, using the standard pin numbering of a 15 pin connector, pin 2 is shorted to pin 14, pin 4 is shorted to pin 12, pin 5 is shorted to pin 6 and pin 8 is shorted to pin 10. Consequently, by shorting the pins as stated above, the connector completes a loop within the DCC of the SONET and acts to retransmit signals to the SONET. In this manner, a 15 pin connector having the aforementioned pin assignment is inserted into a complementary 15 pin insert/drop port on the testing device and enables the dual mode activity by acting as a loop back and returning to the SONET any DCC signals that were received in the testing device.

Consequently, the testing device can now insert an active signal (or payload) into the SONET and simultaneously monitor the payload within the SONET. Alternatively, if the DCC loop plug were not installed on the testing device, the network node (e.g., a multiplexer) to which the testing device is connected would alarm because the node did receive all transmitted signals and the simultaneous performance of the insert/drop mode and the monitor mode could not be performed. In one embodiment, the DCC loop back plug extracts one signal (for example, the signal may be a DS1, DS3 signal) out of the payload for monitoring and re-inserts the same signal back into the payload.

In another embodiment, the DCC loop back plug 25 may be a 37 pin connector. FIG. 3 also shows the pin assignment of the 37 pin connector in accordance with the present disclosure. In this manner, the 37 pin connector is a standard 37 pin connector of which one ordinarily skilled in the art can appreciate. In this manner, the connector contains a housing and 37 conductive pins disposed within housing for transmitting signals.

In this manner, pin 4 is shorted to pin 6, pin 8 is shorted to pin 17, pin 22 is shorted to pin 24 and pin 26 to pin 35. Consequently, by shorting the pins as stated above, the connector completes a loop within the DCC of the SONET and acts as a loop to re-transmit signals to the SONET. In this embodiment, the 37 pin DCC loop plug connects to a complementary 37 pin port on a testing device. As such, this embodiment of a loop back plug also serves to return: back to the SONET any received signals in the testing device such that the insert/drop mode and the monitor modes can be performed by the single testing device.

In this manner, the DCC loop plug enables one testing device to perform both the INSERT/DROP mode and monitor mode simultaneously. In other words, the DCC loop plug enables a single low cost testing device (that ordinary cannot operate in both modes) to perform like a more expensive and more sophisticated testing device that can operate in both modes simultaneously. As such, the inclusion of the DCC loop plug greatly reduces the costs associated with testing a SONET network.

Figure 4:
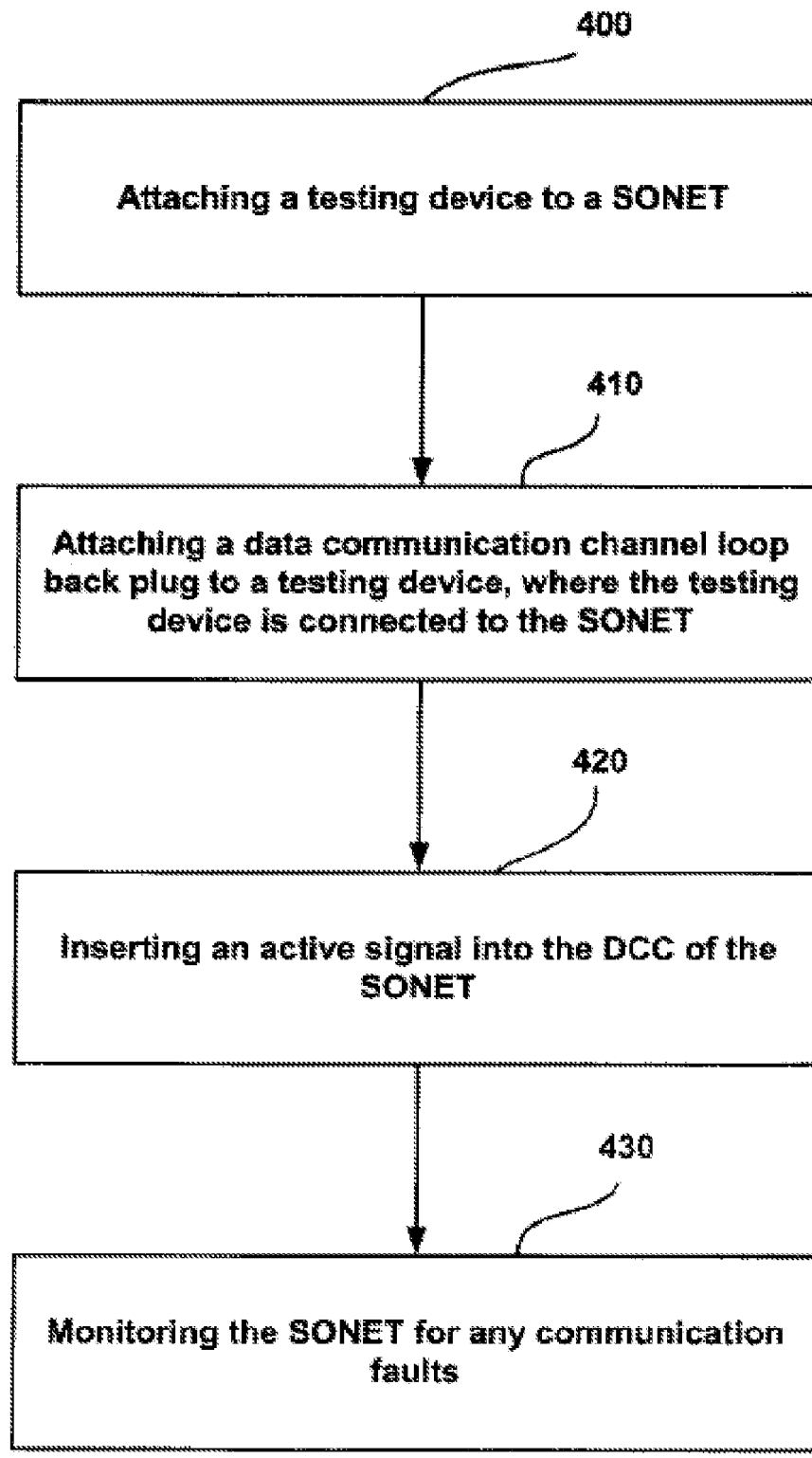
FIG. 4 is a block diagram of an illustrative method in accordance with the disclosure.

FIG. 4 is a block diagram of a method in accordance with disclosure. In the method and as illustrated, at step 400, a testing device is attached to the SONET. A data communication channel loop back plug is attached, at step 410, to the testing device such that the testing device is capable of transmitting any received DCC signals from the SONET back to the SONET. Then an active signal is inserted into the data communication channel of the SONET at step 420 and the SONET is monitored for any communication faults at step 430.

As should now be understood, in the disclosure, systems and methods for testing SONETs are disclosed. Changes could be made to the embodiments disclosed above, however, without departing from the broad inventive concepts thereof. It is understood, therefore, that this disclosure is not limited to the particular embodiments disclosed, but it is intended to cover modifications within the scope of the appended claims.

What is claimed is:

1. A system comprising:
   a testing device configured to be connected to at least one network node of an optical communications network having a data communication channel, the testing device being configured to receive signals from the data communication channel of the network node; and
   a data communication channel loop back plug coupled to the testing device for returning to the network node any signals within the data communication channel received at the testing device, the data communication channel loop back plug comprising a plurality of pins, at least one of the pins being shorted to at least one other of the pins to return to the network node any signals within the data communication channel received at the testing device,
   wherein the data communication channel loop back plug comprises:
   i) a 15 pin connector, and wherein pin 2 of the data communication channel loop back plug is shorted to pin 14, pin 4 is shorted to pin 12, pin 5 is shorted to pin 6, and pin 8 is shorted to pin 10, or
   ii) a 37 pin connector, and wherein pin 4 of the data communication channel loop back plug is shorted to pin 6, pin 8 is shorted to pin 17, pin 22 is shorted to pin 24, and pin 26 is shorted to pin 35.

2. The system of claim 1, wherein the at least one network node comprises at least one of a digital cross-connect and an add/drop multiplexer.

3. The system of claim 1, wherein the data communication channel loop back plug enables the testing device to insert an active signal into the network while monitoring the network for any malfunctions therein.

4. The system of claim 1, wherein the signals received from the data communication channel comprise bytes of information.

5. The system of claim 1, wherein the system consists of a single testing device and a single data communication channel loop back plug coupled to the testing device.

6. The system of claim 1, wherein the optical communications network to which the testing device is configured to be connected comprises a synchronous optical communications network (SONET).

7. A data communication channel loop back plug comprising:
- a plurality of pins, at least one of the pins being shorted to at least one other of the pins to return to a communications network having a communication channel any signals received from the communication channel,
- wherein the data communication channel loop back plug comprises:
  - i) a 15 pin connector, and wherein pin 2 of the data communication channel loop back plug is shorted to pin 14, pin 4 is shorted to pin 12, pin 5 is shorted to pin 6, and pin 8 is shorted to pin 10, or
  - ii) a 37 pin connector, and wherein pin 4 of the data communication channel loop back plug is shorted to pin 6, pin 8 is shorted to pin 17, pin 22 is shorted to pin 24, and pin 26 is shorted to pin 35.

8. The data communication channel loop back plug of claim 7, wherein the data communication channel loop back plug is configured to be coupled to a testing device connected to at least one network node of an optical communications network having a data communication channel.

9. The data communication channel loop back plug of claim 8, wherein the at least one network node comprises at least one of a digital cross-connect and an add/drop multiplexer.

10. The data communication channel loop back plug of claim 8, wherein the data communication channel loop back plug enables the testing device to insert an active signal into the network while monitoring the network for any malfunctions therein without loss of communications between nodes.

11. The data communication loop back plug of claim 8, wherein the optical communications network to which the testing device is configured to be connected comprises a synchronous optical communications network (SONET).

12. A method of testing an optical network having a plurality of network nodes, the method comprising:
- attaching a testing device to the optical network;
- attaching a data communication channel loop back plug to the testing device such that the testing device is capable of transmitting any received signals from the optical network back to the optical network, the data communication channel loop back plug comprising a plurality of pins, at least one of the pins being shorted to at least one other of the pins to return to the optical network any signals within the data communication channel received at the testing device;
- inserting a payload into the network; and
- monitoring the optical network for any communication faults, wherein attaching a data communication channel loop back plug to the testing device comprises attaching:
  - i) a 15 pin connector, and wherein pin 2 of the data communication channel loop back plug is shorted to pin 14, pin 4 is shorted to pin 12, pin 5 is shorted to pin 6, and pin 8 is shorted to pin 10, or
  - ii) a 37 pin connector, and wherein pin 4 of the data communication channel loop back plug is shorted to pin 6, pin 8 is shorted to pin 17, pin 22 is shorted to pin 24, and pin 26 is shorted to pin 35.

13. The method of claim 12, wherein the payload comprises bytes of information.

14. The method of claim 12, wherein monitoring the optical network is performed without any loss of communications between nodes of the optical network.

15. One or more computer-readable media comprising computer-executable instructions configured to, when executed on a processor, at least partially implement the method of claim 12.

16. The method of claim 12, wherein the optical network being tested comprises a synchronous optical communications network (SONET).

17. The method of claim 12, wherein monitoring the optical network for any communication faults comprises extracting one signal out of the payload for monitoring.

18. The method of claim 17, wherein monitoring the optical network for any communication faults further comprises reinserting the extracted signal back into the payload.

19. The method of claim 12, whereby the payload is inserted and the optical network is monitored for communication faults by a single testing device.

20. A system comprising:
- a processor; and
- memory comprising instructions executable on the processor, the memory comprising computer-executable instructions configured to, when executed on the processor, at least partially implement the method of claim 12.

* * * * *